United States Patent [19]
Kimura et al.

[11] 3,762,291
[45] Oct. 2, 1973

[54] FILM MOTOR DRIVE SYSTEM

[75] Inventors: Shuji Kimura; Koichi Daitoku, both of Tokyo, Japan

[73] Assignee: Nippon Kogaku K.K., Tokyo, Japan

[22] Filed: June 1, 1972

[21] Appl. No.: 258,836

[30] Foreign Application Priority Data
June 2, 1971  Japan .............................. 46/38507

[52] U.S. Cl. ........... 95/31 AC, 95/31 EL, 242/71.5, 242/71.6
[51] Int. Cl. .......................... G03b 1/12, G03b 9/68
[58] Field of Search ........... 95/31 R, 31 EL, 31 AC; 352/124, 122, 72; 242/71.4, 71.5, 71.6

[56] References Cited
UNITED STATES PATENTS
| | | | |
|---|---|---|---|
| 1,468,499 | 9/1923 | Frangos | 352/124 |
| 2,161,391 | 6/1939 | Schubert | 95/31 EL |
| 3,598,033 | 8/1971 | Sasaki | 95/31 EL |
| 3,079,850 | 3/1963 | Goldhammer | 242/71.6 X |

*Primary Examiner*—Robert P. Greiner
*Attorney*—Joseph M. Fitzpatrick et al.

[57] ABSTRACT

A film motor drive system includes a motor provided in a motor drive portion and a second motor provided in a long-film magazine portion. An electric circuit is provided so that the motor in the long-film magazine portion alone is energized when a camera's sprocket is made free to rotate by upward movement of a camera's rewind button during film loading or at the end of photo-taking operation. Thus, the forward and rearward leaders of the film may be taken up before and after the photo-taking operation. The motor drive system may further include forward counter means and/or reverse counter means connected with a switch inserted in the electric circuit.

3 Claims, 5 Drawing Figures

FILM MOTOR DRIVE SYSTEM

BACKGROUND OF THE INVENTION

1. Field of the Invention

This invention relates to a film motor drive system for cameras, and more particularly, to such a system for driving relatively long lengths of film.

2. Description of the Prior Art

When a camera is loaded with a roll of film, it is usually necessary to effect idle take-up of a pre-exposed film portion or forward leader.

In the case of a 36-frame film, which requires a relatively small amount of idler take-up, the problem is not severe. However, in the case of a longer film, the amount of idle take-up is greater, say, five to six frames for a camera of the 250-frame magazine type, or about one meter for a 33m reeled film. In these cases, it is cumbersome if the camera's shutter has to be operated for each idle take-up operation as has been done heretofore. In fact, such idle shutter operation has often been neglected by users, thus resulting in unsuccessful pnotography.

Also, when a long film is to be removed from the camera after the completion of photo-taking, all the exposed film is completely rewound into the magazine or the exposed film is taken up on a take-up reel and then wrapped with an extra film portion or rearward leader which may be safely used under exposure.

This process has also required the shutter operation to be repeated each time, as in the case of the forward leader, and could cause similar inconveniences and difficulties.

SUMMARY OF THE INVENTION

We have conceived a system of the class described by which the forward and rearward leaders of a long film can be taken up by means of a take-up motor without reforming a conventional camera, and without operating the camera's shutter during such take-up operation.

Additionally, by means of the present invention, we are able to control the take-up amount of the forward and rearward leaders so as to ensure that the take-up will be effected to predetermined extent thereby eliminating any misusage of the camera.

The present invention provides a motor drive system of the two-motor type which comprises a motor provided in a motor drive portion, a motor provided in a long-film magazine portion, and an electric circuit arranged so that the motor in the long-film magazine portion along is energized when a camera's sprocket is rendered free to rotate by raising the camers's rewind button during film loading, or at the end of the photo-taking operation. Thus, the forward and rearward leaders of the film may be taken up before and after the photo-taking operations. The motor drive system may further comprise a forward counter adapted automatically to restore its start position during film loading. The forward counter is connected with a switch inserted in the circuit, the switch being adapted to open the circuit when a predetermined length of the film has been taken up before the photo-taking operation is commenced, thereby completing take-up of the forward leader. The motor drive system may further comprise a reverse operation counter adapted to assume its zero position at the end of a predetermined photo-taking operation. The reverse counter is connected with a switch inserted in the circuit, whereby at the end of the photo-taking operation, the long-film take-up motor alone may be energized to take up the rearward leader.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BREIF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENTS

Figure 1:
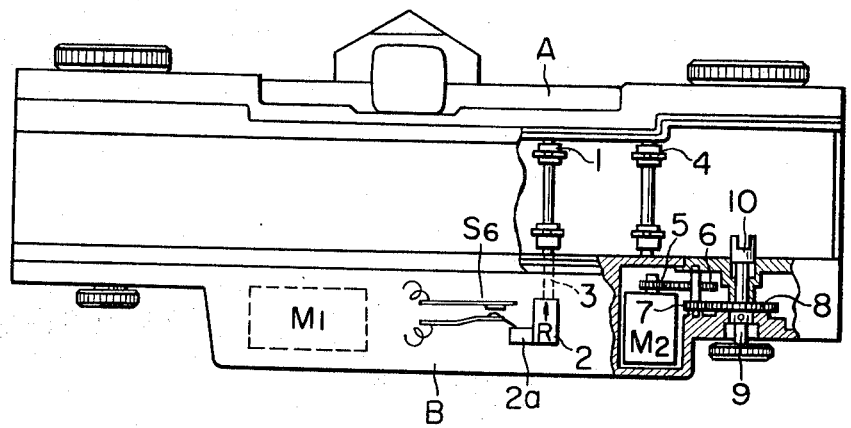
FIG. 1 is a partly broken-away rear elevational view of a camera showing the long-film motor drive system according to the present invention.

Referring to FIG. 1, there is shown a camera generally designated A and which includes a sprocket 1 operatively associated with a film and shutter charge mechanism so that the sprocket is controlled to be rotated an amount corresponding to each single frame of the film.

A rewind button 2 (hereinafter referred to as "R-button") is vertically movable and is such that its movement, in the direction of the arrow, causes a shaft 3 to be moved in the same direction operatively to dissociate the sprocket 1 from the shutter charge mechanism to permit free rotation of the sprocket 1. The camera, as described thus far, is conventional.

A projection 2a, formed integrally with the R-button 2, acts to close a switch S6 upon movement of the R-button 2 in the direction of the arrow. Thus, the switch S6 is closed when the sprocket 1 is operatively dissociated from the shutter mechanism.

A motor drive system, generally designated B, includes a motor M1 for driving a conventional motor drive mechanism (designated 12 in FIG. 2), which motor provides a drive source for the camera's shutter and film charge operations and for the shutter release operation. A long-film take-up motor M2 is provided to rotate a shaft 9 via gears 5, 6, 7 and 8, and cause a fork-like member 10, integral with the shaft 9, to take up a film. A film counter sprocket 4 will be described later.

Figure 2:
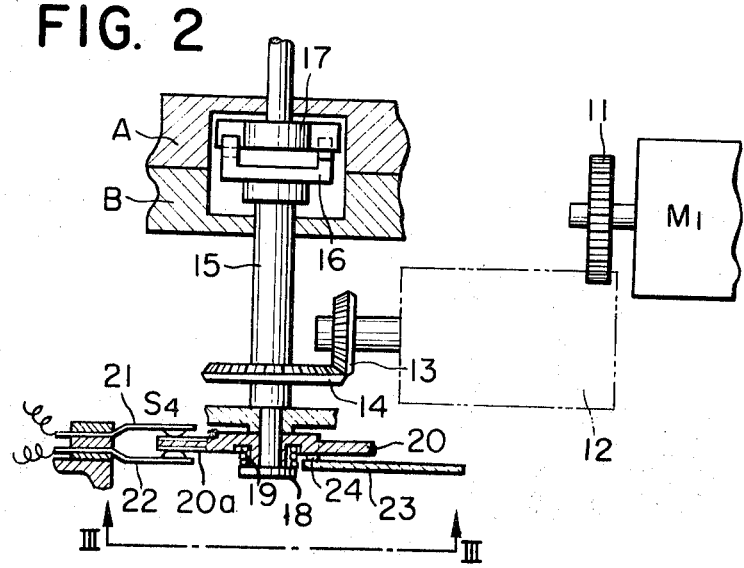
FIG. 2 is a view showing the starting switch portion for the long-film take-up motor.

Referring to FIG. 2, it will be seen that the drive of the motor M1 is transmitted to a gear 11 securely mounted on the shaft of the motor M1 and, when film winding is effected by a conventional drive mechanism 12, is further transmitted via bevel gears 13 and 14 to a shaft 15 to rotate a coupling 16. A wind shaft 17 of the camera A is rotated by the coupling 16 to wind the film and charge the shutter. Although not shown, it should be understood that the drive mechanism 12 is also provided with means for releasing the shutter upon rotation of the motor M1. During such shutter release, the bevel 13 is not in rotation.

The shaft 15 has, at one end thereof, a thrust collar 18 which cooperates with a spring 19 frictionally to connect an insulator plate 20 to the shaft 15.

Figure 3:
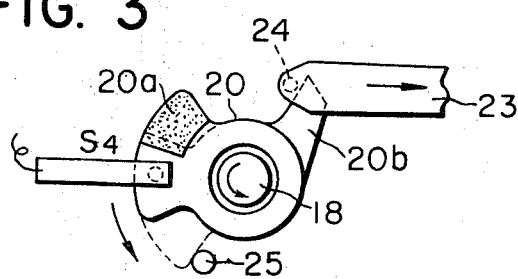
FIG. 3 is a detailed plan view taken along the lines III-—III in FIG. 2.

Referring to FIG. 3, the insulator plate 20 has a portion 20a which is electrically conductive and which cooperates with resilient switch contacts 21 and 22 to constitute a switch S4.

The insulator plate 20 also has a projected portion 20b which is engaged with a pin 24 studded in a lever 23 connected to the drive mechanism 12. A stop pin 25 is provided to limit the rotation of the insulator plate 20.

The lever 23 acts so that, upon completion of the film winding operation, it is moved in the direction of the arrow by the drive mechanism to cause the pin 24 thereon to return the insulator plate 20 from its phantom-line position (in which the switch S4 is closed) to its full-line position (in which the switch S4 is open).

Figure 4:
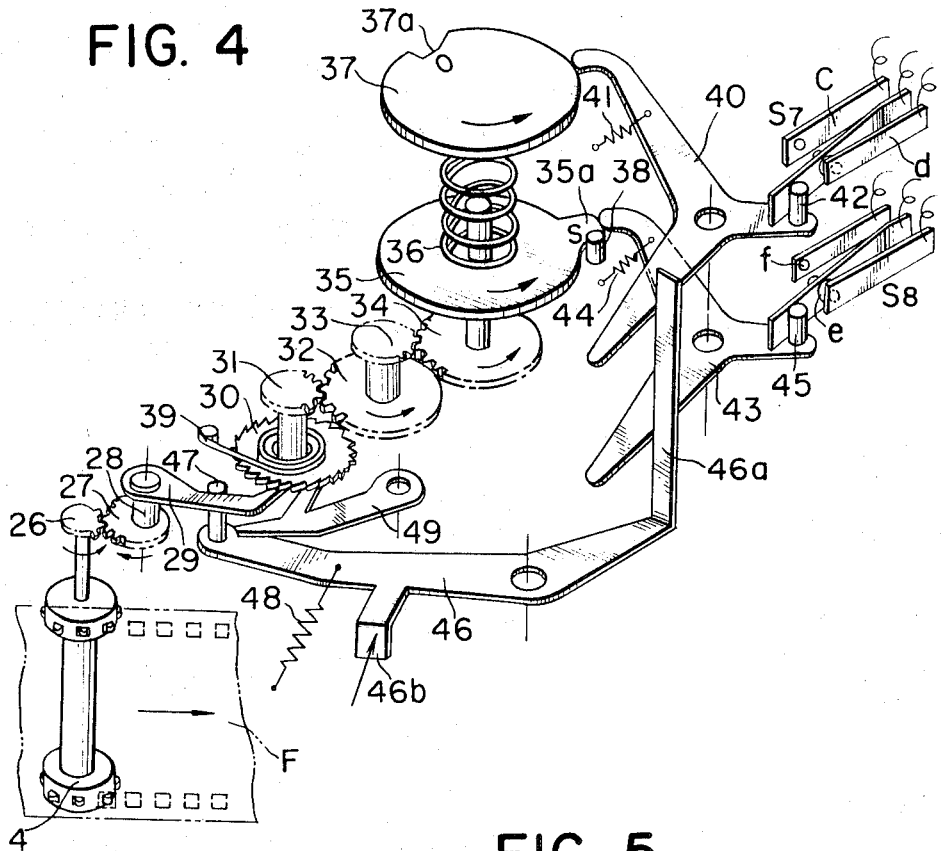
FIG. 4 is a perspective view illustrating the counter portion together with the counter switch portion.

FIG. 4 shows a film counter mechanism and a switch mechanism. Sprocket 4 is rotated with the take-up movement of the film F, thereby rotating meshed gears 26 and 27. The gear 27 has a shaft 28 studded eccentrically thereon angularly to rotate a feed pawl 29 which, in turn, feeds a ratchet gear 30 tooth-by-tooth. The movement of the ratchet gear 30 may be transmitted via gears 31, 32 and 33 to a gear 34. A disc 35, integral with the gear 34 by means of a common shaft, is a forward counter plate and is formed with a projected cam portion 35a. A friction spring 36 is provided to establish a frictional connection between a reverse counter plate 37 and the forward counter plate 35. (Although no thrust bearing is shown, it should be understood that a suitable support for plate 37 is provided). The reverse counter plate 37 has a recessed portion 37a, for a purpose later to be described. A stop member 38, for limiting the rotation of the forward counter plate 35, is shown in a start position (i.e., position S) where it is engaged with the projected cam portion 35a of the forward counter plate 35 by the force of a spiral return spring 39 secured to the ratchet gear 30.

A lever 40 has one arm thereof urged into engagement with the reverse counter plate 37 by a spring 41; and an insulator pin 42 is studded in another arm of the lever 40 to change over a switch S7 from its contact d to its contact c when the reverse counter is in its O position wherein the lever 40 is received in the recessed portion 37a.

A second lever 43 has one arm thereof urged into contact with the forward counter plate 35 by a spring 44 so as to change over a switch S8 between its contacts e and f with the aid of an insulator pin 45 studded in another arm of the lever 43.

A lever 46, for returning the counters, is normally biased counter-clockwise by a spring 48 and has an upwardly bent portion 46a engageable with the two levers 40 and 43, and a downwardly bent portion 46b adapted to be actuated by the camera's back cover. The lever 46 also has a pin 47 studded at one end thereof and engaged with the ratchet pawl 29.

A pawl 49 is provided to check the reverse rotation of the ratchet gear 32.

Figure 5:
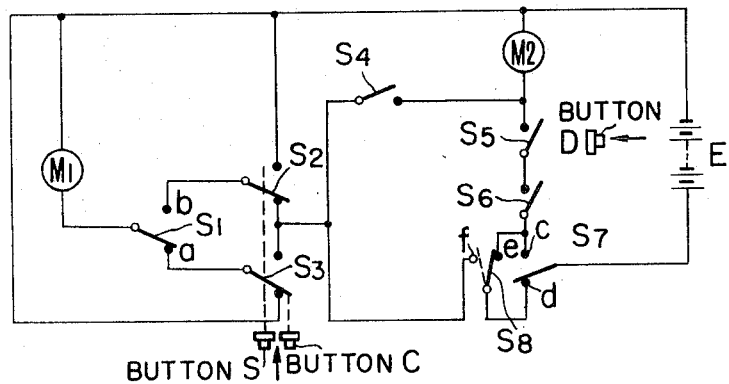
FIG. 5 is a diagram of the electric circuit of the present invention combined with a conventional motor drive system.

Referring now to FIG. 5, the electric circuit shown includes the aforesaid motor M1 and switch S1 which may be automatically changed over so as to assume the position a upon completion of the film winding operation by the drive mechanism 12, and to assume the position b during shutter release and charge. Switches S2 and S3 are photo-taking operating switches which may be changed over simultaneously for a single-frame shot by manual operation of a photo-taking operating button S, but only one of which, i.e., switch S3, may be changed over to a continuous photo-taking mode by manual operation of another operating button C. Switch S4, as has been described with respect to FIGS. 2 and 3, is a switch which may automatically be closed during the film winding operation and opened at the end of such winding operation. Switch S5 may be closed by an idle take-up operating button D, and switch S6 may be closed by the R-button 2 shown in FIG. 1. Switch S7 may be changed over to its contact c with the reverse counter plate 37 being at its O position. S8 designates a switch which may be changed over to its contact e when the lever 43 is in engagement with the projected portion 35a of the forward counter plate 35. Letters E and M2 designate a power source and a long-film take-up motor, respectively.

In the described construction, when the camera's back cover is opened, the position 46b of the lever 46 is released from a pressure which has been imparted thereto by the cover, so that the lever 46 is rotated counter-clockwise by the spring 48 while the feed pawl 29 is disengaged from the ratchet gear 30 by the pin 47, thereby also disengaging the check pawl 49 from the ratchet gear 30. At the same time, the bent portion 46a of the lever 46 disengages the levers 40 and 43 from the respective counter plates 37 and 35, both of which are rotated with the ratchet gear 30 by the action of the spiral return spring 39 via the gear train 31–34 until the projected portion 35a of the counter plate 35 returns to its start position where the projected portion 35a is engaged by the limit pin 38. When the camera is loaded with a long-film and its back cover is closed, the lever 46 is rotated clockwise because of the force imparted to the portion 46b thereof so that the feed pawl 29 and check pawl 49 are brought into engagement with the ratchet gear 30 while the levers 40 and 43 are brought into engagement with the counter plates 37 and 35, respectively. At this time, such engagement between the lever 40 and the reverse counter plate 37 takes place at a point other than the recessed portion 37a which provides the O position of the reverse counter plate 37, and this causes the switch S7 to change over to its contact d. On the other hand, the engagement between the lever 43 and the forward counter plate 35 takes place at the projected portion 35a and this causes the switch S8 to change over to its contact e.

Since the reverse counter plate 37 is maintained in contact with the forward counter plate 35 by the friction spring 36 interposed therebetween, it may be manually adjusted to the length of the loaded film (say, 250 frames).

When an attempt is made to effect photo-taking without idle feeding after film loading, the switch S8, now being in its e position, prevents rotation of the motor M1 even if the switches S2 and S3 are closed, thus, in turn, preventing the occurrence of the photo-taking operation. In order to effect idle feeding of the film, the R-button 2 is first raised to operatively dissociate the camera's sprocket 1 from the shutter mechanism, thus closing the switch S6. The idle take-up button D is then depressed to close the switch S5, whereupon the motor M2 alone is energized through a circuit E – S7d – S8e – S6 – S5 – M2 – E. The drive of the motor M2 is transmitted through the gears 5, 6, 7, 8 to the shaft 9, which is rotated to take up the film by means of the fork-like member 10. The moving film causes rotation of the sprocket 1, and further of the sprocket 4, because the operative connection with the shutter charge mechanism is now cut off by the R-button 2, as described above.

As has been noted already, the sprocket 4 also transmits the angular movement of the feed pawl 29 via the gears 31, 32, 33, 34 to the forward counter plate 35, which is thus rotated in the direction of arrow, as indicated in FIG. 4. When a predetermined amount of film has been idly fed, the lever 43 is received into the peripheral portion of the forward counter plate 35 which has a smaller diameter than the projected portion 35a, thus changing over the switch S8 to its contact f. This cuts off the power supply to the motor M2 and deenergizes the same. Thus, it will be seen that the idle feeding of the forward leader of the film has been completed.

If the photo-taking operating button is then depressed, there will be formed a circuit E – S7d – S8f – S3 – S1a – M1 – E, so that the motor M1 will be energized to release the shutter. (During the film loading operation when the shutter is released, the film is automatically wound up to a predetermined position by the change-over of the switch S8 to its contact f.) Upon shutter release, the switch S1 changes over to its contact b. Even if the switch S1 is changed over to such position when the switch S3 alone is actuated by the operating button C for effecting a continuous shot, the motor M1 will continue to rotate by season of the circuit E – S7d – S8f – S2 – S1b – M1 – E, thereby to begin to wind the film. The revolution of the motor causing the film winding is transmitted through the gear 11, drive mechanism 12 and bevel gears 13, 14 to the shaft 15, whose rotation causes the insulator plate 20 to be rotated in the direction of the arrow with the aid of the friction spring 19 to assume the phantom-line position as shown in FIG. 3.

Thus, the switch S4 is closed to form a circuit E – S7d – S8f – S4 – M2 – E, so that the motor M2 is also energized to take up the film.

When the film winding is completed, the switch S1 is again changed over to its contact a. At the same time, the lever 23 in FIG. 3 is moved in the direction of the arrow by the drive portion 12 so that the pin 24 actuates the projected portion 20b of the insulator plate 20 to bring the plate 20 from the phantom-line position (where the switch S4 is closed) to the solid-line position where the switch S4 is open, thus deenergizing the motor M2.

If the photo-taking operating button C remains depressed (i.e., if the switch S3 remains closed), the above-described procedures will be repeated so that the shutter release will be effected only by the motor M1, but during the film winding operation, both motors M1 and M2 will revolve for this purpose.

If the operating button C is released to return the switch S3, the motors will stop at the end of the film winding operation. (For a single-frame shot, the photo-taking operating button S may be depressed to change over the switches S2 and S3 simultaneously, thereby stopping the motors with the shutter released, and when the switches S2 and S3 are returned, the film will be wound up to a predetermined position, whereupon the motors will stop.)

As the photo-taking operation is repeated in this way, the sprocket 4 is rotated with the take-up movement of the film, thereby to rotate the counters in the forward direction. When all the frames of the loaded film have been exposed (i.e., when the scale of the reverse counter comes to its zero position), the lever 40 is received in the recessed portion 37a of the reverse counter 37 to change over the switch S7 from its contact d to its contact c. Irrespective of the positions then taken by the phototaking operating switches S2 and S3, the switches S8 and S7 have already been changed over to their contacts f and c, respectively, so the power supply to the motor M1 is cut off to deenergize the same and prevent any further photo-taking operation. At the same time, the camera is ready for the idle feeding of the rearward leader of the film.

Thereupon, the R-button 2 is raised, as was done for the idle feeding of the forward leader, and further, the idle feed operating button D is depressed, whereby the switches S6 and S5 are closed to form a circuit E – S7c – S6 – S5 – M2 – E, through which the motor M2 alone is energized to effect the idle feeding of the rearward leader.

Taking up a predetermined amount of film is ensured because the lever 40 passes over the recessed portion 37a of the reverse counter plate 37 to thereby change over the switch S7 from its contact c to its contact d and thus deenergize the motor M2.

While the return lever 46 for the counters has been described as being engaged by the camera's back cover, it may also be provided by the film magazine or combined with the back cover opening-closing means.

Also, the illustrated embodiment employs forward and reverse counter plates to accomplish the idle take-up of the forward and rearward leader of the film, and the reverse counter may be eliminated.

Further, the reverse and forward counter plates 37 and 35 may be formed with suitable indicia such as numbers or divisions so that they may be utilized as the counter display means. Alternatively, such counter display means may be provided separately from the counter plates.

The system of the above-described construction, according to the present invention, may result in the following various advantages:

1. The leaders of the film can be taken up without operating the shutter each time, thus improving the convenience of use.

2. The combination of the amount of each leader to be taken up with the counters enables the idle take-up to be accomplished in a necessary and sufficient amount, which also leads to a practical convenience.

3. The provision of two different types of counter, i.e., forward and reverse counters, permits the number of exposed frames and the number of unexposed frames to be known at a glance which, in turn, is beneficial to the users.

4. Unless the forward leader is idly fed, depression of the photo-taking operating button (button S or C) would not result in a photo-taking operation, thus avoiding any misuse of the camera and failure in photography.

We believe that the construction and operation of our novel film motor drive system will now be understood and that its several advantages will be fully appreciated by those persons skilled in the art.

We claim:

1. In a camera with a motor drive system including at least
   a first electric motor ($M_1$);
   a sprocket (1) for transporting film;
   drive means (11, 12, 13, 14, 15, 16 and 17) operatively connected with the sprocket and a shutter mechanism, to rotate the sprocket and cock the shutter upon rotation of the motor ($M_1$);
   a second electric motor ($M_2$) operatively associated with the drive means to rotate while the drive means rotates the sprocket, to thereby wind up the transported film;
   and a rewinding button for disconnecting the sprocket from the drive means to permit of free rotation of the sprocket;
   the improvement comprising:
   a circuit for the second electric motor ($M_2$);
   a first electric switch ($S_6$) provided in the circuit and associated with said rewinding button to close when the rewinding button disconnects the sprocket from the drive means;
   a normally open second electric switch ($S_5$) provided in the circuit manually operable to close;
   first means for controlling the circuit to wind up a predetermined length of forward film-leader prior to phototaking when the film is loaded in the camera, and the first and second switches are closed;
   and second means for controlling the circuit to wind up a predetermined length of rearward film-leader when a predetermined length of film is photographed, and the first and second switches are closed.

2. A camera according to claim 1, wherein said first means includes
   a forward counter (35) which automatically returns to its start position when the film is loaded in the camera and
   a third switch ($S_8$) provided in the circuit, operatively associated with said forward counter in such a manner that said forward counter closes the third switch ($S_8$) at the start position thereof and opens the third switch when the forward counter is rotated by a predetermined angle from its start position.

3. A camera according to claim 1, wherein said second means includes
   a rearward counter (37) which is positioned at its zero position upon completion of a predetermined phototaking operation and
   a fourth switch ($S_7$) provided in the circuit, operatively associated with said rearward counter in such a manner that the rearward counter closes the fourth switch ($S_7$) at the zero position thereof to energize said second motor to take-up said rearward leader, and opens the fourth switch when the rearward counter is rotated by a predetermined angle from its zero position.

* * * * *